Figure 1:
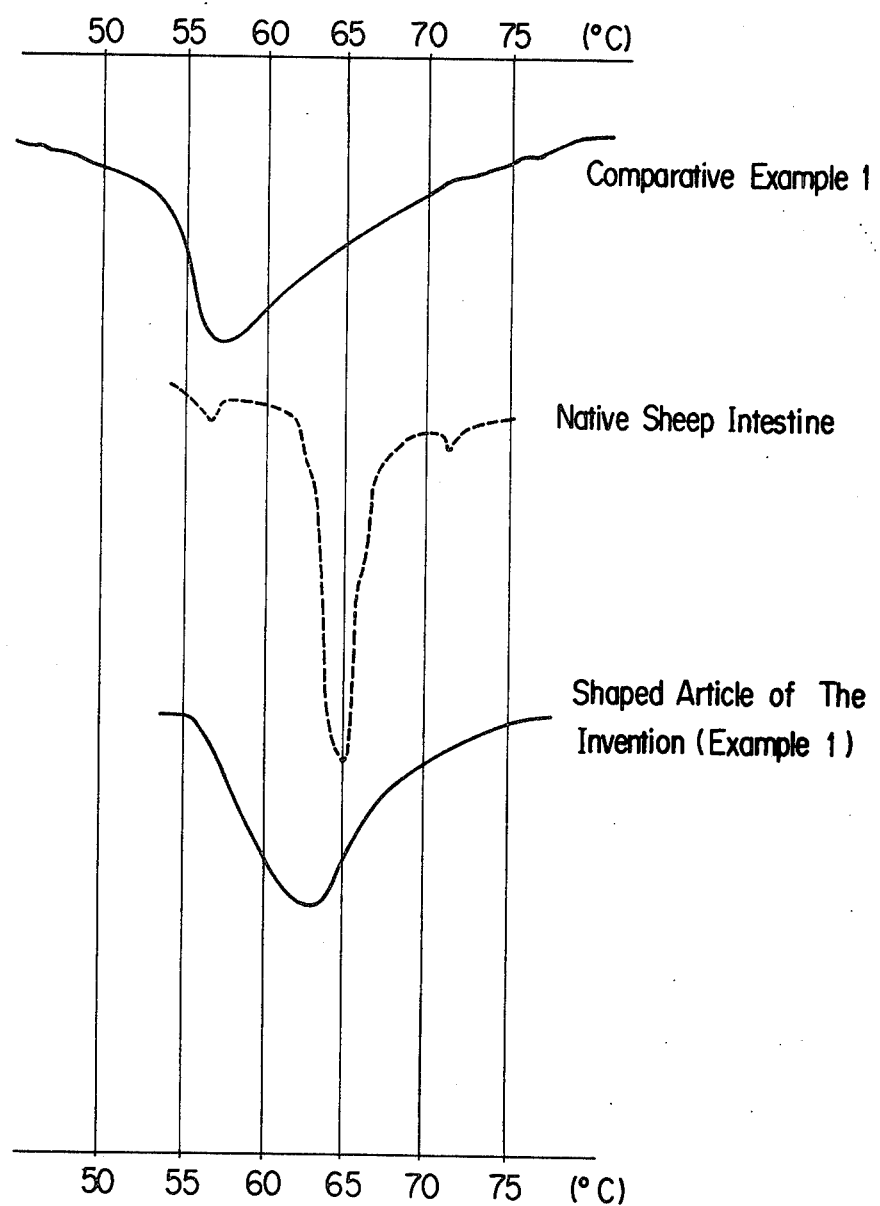

United States Patent [19]

Funabashi et al.

[11] 4,455,206

[45] Jun. 19, 1984

[54] SHAPED ARTICLE OF COLLAGEN AND PROCESS FOR PREPARING SAME

[75] Inventors: Masayuki Funabashi; Yoshikazu Kokubu, both of Iwaki, Japan

[73] Assignee: Kureha Kagaku Kogyo Kabushiki Kaisha, Tokyo, Japan

[21] Appl. No.: 332,711

[22] Filed: Dec. 21, 1981

[30] Foreign Application Priority Data

Jul. 27, 1981 [JP] Japan .................. 56-117498

[51] Int. Cl.³ .................. C25D 13/06; C25D 13/12
[52] U.S. Cl. ................................. 204/181 F
[58] Field of Search .................... 204/181 F

[56] References Cited

U.S. PATENT DOCUMENTS

| | | | |
|---|---|---|---|
| 3,556,969 | 1/1971 | Mizuguchi et al. | 204/181 F |
| 4,273,705 | 6/1981 | Kato | 260/123.7 |
| 4,294,677 | 10/1981 | Sakagami et al. | 204/181 F |
| 4,320,175 | 3/1982 | Hisazumi et al. | 428/518 |

Primary Examiner—Howard S. Williams
Attorney, Agent, or Firm—Wegner & Bretschneider

[57] ABSTRACT

A shaped article of collagen having 5 to 20 μm of thickness, the peak maximum temperature of endothermic denaturation thereof being in the range of 62° to 71° C., the wet tensile strength thereof being in the range of 3 to 6 kg/mm² and the wet tear strength thereof being in the range of 25 to 150 g·cm/cm is prepared by a process comprising cross-linking a collagenous material so that the difference of the peak maximum temperatures of endothermic denaturation of the material between before and after the cross-linking falls in the range of 1.0° to 10° C. and the peak maximum temperature after the cross-linking falls in the range of 63° to 74° C., fibrating the cross-linked collagenous material to prepare an aqueous dispersion with the viscosity of 100 to 2000 cP and the spinnability of 30 to 80 mm at the concentration of 1% by weight of collagen fiber and subjecting the dispersion to electrodeposition.

7 Claims, 5 Drawing Figures

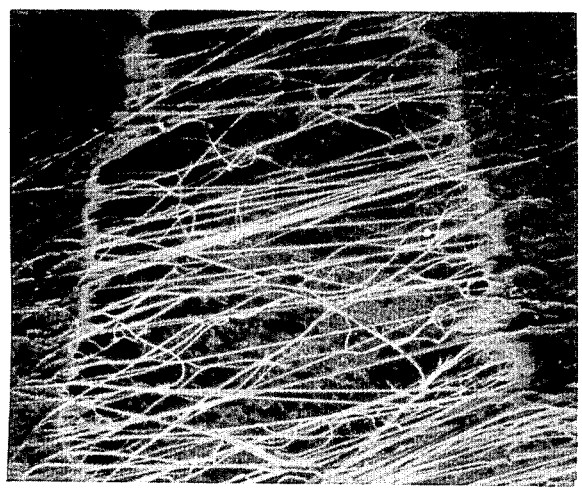
Fig. 3  X80
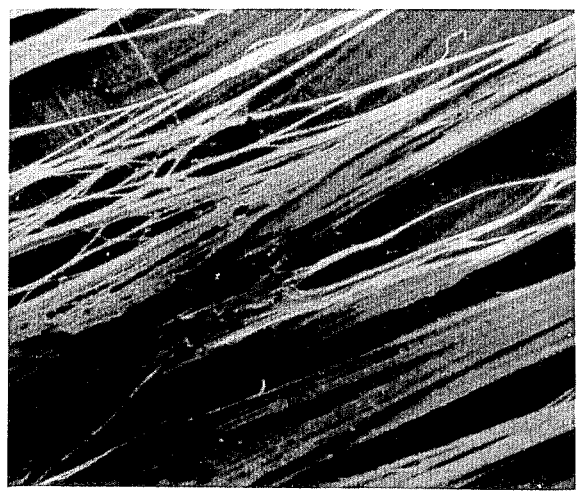
X80
Fig. 4

X80

SHAPED ARTICLE OF COLLAGEN AND PROCESS FOR PREPARING SAME

This invention relates to a shaped article of collagen and a process for preparing the same. More particularly, the invention relates to a shaped article made of artificially reconstituted collagen fibers, which resembles a shaped article made of native collagen in physical properties, and an electrochemical process for preparing the same.

A film-like edible casing for wrapping foodstuffs such as hams and sausages and a thread- or string-like article such as a gut for surgical sutures, rackets or stringed instruments have been hitherto made of intestines, tendons or the like of an animal by some treatment and forming, the article thus made being hereinafter referred to as "shaped article of native collagen". Recently, a process has been developed for preparing a shaped article of collagen as a substitute for the shaped article of native collagen.

A "shaped article of collagen" indicates hereinafter a shaped article made by a process comprising fibrating a collagenous material of an animal such as hides, connective tissues, intestines, tendons and muscles into collagen fibers and reconstituting artificially the collagen fibers. As a raw collagenous material, hides particularly steer hides are frequently used (for example, Japanese Patent Publication Nos. 27378/70, 33738/70, 18581/71 and 11426/74).

Collageneous material is composed of fiber bundles having diameter of the order of $10^2$ μm which is composed of fibers having diameter of the order of 1 μm, the fibers being composed of fibrils having diameter of the order of $10^3$ Å which is composed of collagen molecules.

The process first proposed for preparing a shaped article of collagen comprises extruding a paste of collagen fibrils from a slit (for example, Japanese Patent Publication Nos. 22725/63, 22389/65, 20061/66, 41451/71 and 42938/71). However, there are many disadvantages in the extruder process as follows:

(a) the thickness of the article obtained is limited by the slit size of the extruder, accordingly, an article with an optional thickness cannot be easily obtained, (b) the thickness of the article is limited to at most about 30 μm, (c) the paste of collagen fibrils is difficult to debubble because of relatively high concentration of collagen fibrils in the paste, (d) the wet film after extrusion is soft and easily tearable, accordingly the wet film is necessary to be coagulated for improving the strength, (e) the treatments before and after extrusion are complicated, and (f) the process requires a precise mold.

A process was proposed by Mizuguchi et al. instead of the above mentioned process based on the mechanical principles and means, the proposed process being based on the electrochemical principles and means (Japanese Patent Publication Nos. 13636/71 and 24257/72).

The process by Mizuguchi et al. comprises fibrating a collagenous material, i.e. depilated, defatted and ash-removed hides of an animal, to prepare an aqueous acidic dispersion of collagen fibrils, introducing the dispersion into an electrodeposition cell provided with a cathode and an anode, applying a d.c. voltage between the electrodes to electrophorese positively charged collagen fibrils to the cathode, and bringing the fibrils into reaction with hydroxyl ions (OH$^-$) formed by electrolysis of water at the cathode to deposite on the surface of the cathode in a mutually entangled state and to form an article while neutralizing and dehydrating.

This process is superior to the extruder process because of advantages as follows:

(a) an article with an optional size and shape may be obtainable by varying the shape of the electrode, (b) an article with optional thickness may be easily obtainable, (c) the article is easy to be treated after electrodeposition, since the collagen fibrils are dehydrated on the surface of the electrode and the membrane of the article is dense and improved in strength, (d) the article by the electrodeposition process is superior in mechanical strength to the article by the extruder process, since the collagen fibrils are complicatedly and mutually entangled in the article obtained by the electrodeposition, (e) the dispersion is easily debubbled because of relatively low concentration of collagen fibrils in the dispersion, and (f) an apparatus for electrodeposition is relatively simple as compared with the extruder process.

As described above, the electrodeposition process is very excellent in preparation of a shaped article of collagen. A shaped article obtained by electrodeposition, however, is inferior in some physical properties to a shaped article of native collagen.

The mechanical strength such as tear strength and tensile strength is the representative property of a shaped article of collagen inferior to that of a shaped article of native collagen. For example, an edible casing made of native sheep intestines with the thickness of about 5 to 8μ has an practical strength, i.e. the edible casing may be stuffed with hams or sausages with little rupture, on the other hand, a shaped article obtained by the electrodeposition process may be practically usable with the thickness of 20 to 30μ as described in Mizuguchi's patent.

An edible casing requires particularly the high tear strength since it is stuffed with hams or sausages mechanically by an automatic or semiautomatic meat stuffing machine. The tear strength has been hitherto improved by increasing the thickness in an artificially produced edible casing. However, an artificial edible casing which is as thin as an edible casing of native sheep intestines has been demanded.

A sausage with a casing of native sheep intestines has small twisted links which are not broken in boiling and frying, and gives a feeling of high quality and a crispy feeling in biting. These properties, unique to the native sheep intestine casing, are due to the extremely small thickness (5 to 8μ) of the dry membrane.

The inventors have found by measuring the thermal denaturation temperature (collagen to gelatine transition temperature) of the native sheep intestines with a differential scanning calorimeter that the peak maximum temperature of endothermic denaturation is in the range of 62° to 68° C. and the almost endothermic enthalpy is absorbed within the temperature range of 62° to 71° C. (refer to FIG. 1, a method of the differential scanning calorimetry being described hereinafter).

Accordingly, a shaped article of collagen with a thin and strong membrane similar to the native sheep intestines may be provided by preparing collagen with the same thermal properties e.g. peak maximum temperature of endothermic denaturation as the naive sheep intestines, suggesting that the collagen obtained has the same cleavage energy of interfiber bondings as the native sheep intestines.

For reference, a shaped article of collagen by a conventional electrodeposition process has the lower peak maximum temperature and the broader curve of the peak as compared with the native sheep intestines (refer to FIG. 1), and the article has only insufficient strength.

According to a conventional fibration process, depilated, defatted and ash-removed hides of an animal (unhaired hides or corium layers) are cut into adequate size, well swollen with a weak acid and simultaneously beaten mechanically by e.g. a mortar to divide the bundles. However, it is difficult to fibrate into fibers with nearly uniform length and diameter, and the collagen bundles are fibrated into fibrils or molecules since fibrilation and shortening of fibers are extremely proceeded.

A membrane obtained from fibrils or molecules is extremely weak in tear strength, and the dispersion of fibrils or molecules has the disadvantages described below because of high viscosity: the operatability of the electrodeposition process is reduced because of lack of fluidity in the dispersion and collagen may be thermally denatured by friction heat when mechanically stirred or beaten.

It is an object of the invention to provide a shaped article of collagen with a small membrane thickness and high mechanical strength similar to a shaped article of native collagen. An another object of the invention is to provide a process for preparing the shaped article of collagen by electrodeposition.

Figure 2:
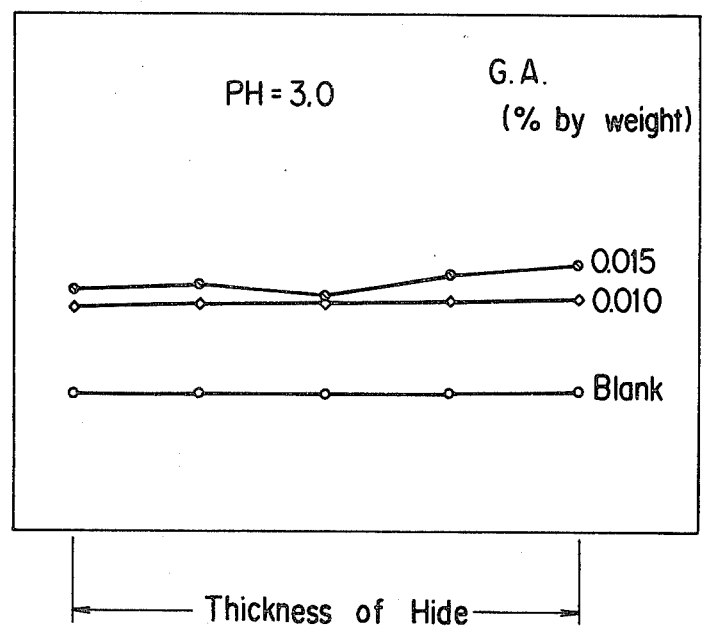
Figure 5:
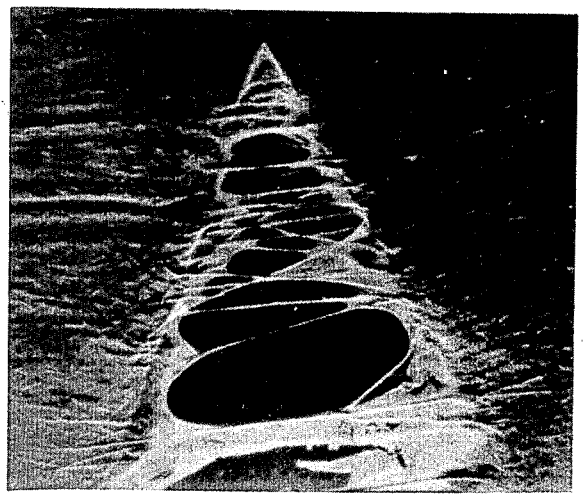

Of the drawings, FIG. 1 shows the curves of the thermal denaturation temperature of the shaped article of the invention (Example 1), the conventionally shaped article (Comparative Example 1) and the shaped article of native sheep intestine measured by a differential scanning calorimetry. FIG. 2 shows the uniform cross-linking inside the hides in the process of the invention. FIGS. 3, 4 and 5 show the electron micrographs (enlarged by 80 times) of the article of the invention, the article of native sheep intestine and the conventional article, respectively.

The shaped article of collagen of the invention (hereinafter referred to us "the article of the invention") has 5 to 20 $\mu$m of thickness in dry state (that is, measured with the article of the invention containing about 20% by weight of water), the peak maximum temperature of endothermic denaturation in the range of 62° to 71° C., the wet tensile strength in the range of 3 to 6 kg/mm$^2$ and the wet tear strength in the range of 25 to 150 g·cm/cm. At least 50%, preferably more than 70% of the total endothermic enthalpy is absorbed within the temperature range of ±4.6° C. around the peak maximum temperature as a center in the thermal denaturation of the article of the invention. The article of the invention comprises thin and long collagen fibers with 1 to 4 $\mu$m in diameter and 0.1 to 20 mm in length in dry state which are obtained by fibrating a cross-linked collagenous material, and is prepared by entangling sufficiently the collagen fibers.

The article of the invention has an optional shape such as film-, tube- and thread- (or string-) like shape, and is applicable to various fields, for example, an edible casing, other wrapping materials, a suture for surgical operation.

The article of the invention is preferably usable as an edible casing for wrapping foodstuffs. The article of the invention with 7 to 15 $\mu$m in dry thickness is preferable when used as an edible casing for hams or sausages. With such a thin membrane, the article of the invention has the wet tensile strength in the range of 4 to 6 kg/mm$^2$ and the wet tear strength in the range of 25 to 100 g·cm/cm, and accordingly, may endure tearing forces and the like when being filled with foodstuffs.

The process for preparing the article of the invention is described below in detail in the case of using, for instance, animal hides. As a raw collagenous material of the invention, however, connective tissues, intestines, tendons, muscles and the like of an animal may be used as well as hides, provided that a raw material is rich in collagen.

The process of the invention comprises cutting animal hides (unhaired hides or corium layers) into adequate sizes after depilating (not necessary in the case of using materials without pile), defatting and ash-removing, cross-linking the hides, fibrating the cross-linked hides to prepare an aqueous dispersion of collagen fibers with a predetermined viscosity, and subjecting the dispersion to electrodeposition to obtain a shaped article of collagen.

According to the cross-linking, the hides become stronger in the fibrous structure, enabling the hide to be protected from excess swelling, and the hides become also hydrophobic, thereby the collagen fibers are protected from fibrilation and shortening in the fibration of the hides.

With inadequate cross-linking, fibrilation and shortening of the fibers may be caused in the fibration of the hides. Accordingly, the viscosity of the dispersion obtained is higher and only films having low strength are obtained by electrodeposition with less productivity as in the conventional fibrating process. On the other hand, the collagen bundles are incompletely divided with excess cross-linking, and it is difficult to prepare a dispersion containing mainly collagen fibers with 1 to 4 $\mu$m in dry diameter.

In the process of the invention, the degree of cross-linking is regulated so that the thermal denaturation temperature of the cross-linked hides falls in the predetermined range so as to avoid the inadequate and excess cross-linking. Namely, the difference between the peak maximum temperatures of endothermic denaturation of the hides before and after the cross-linking falls in the range of 1.0° to 10° C. and the peak maximum temperature after the cross-linking falls in the range of 63° to 74° C. in the cross-linking process of the invention.

A cross-linking agent may be an aldehyde such as formaldehyde, acetaldehyde, glyoxal, methyl glyoxal, glycol aldehyde, acrolein, crotonaldehyde, succinyl aldehyde, glutaraldehyde, dialdehyde starch, dialdehyde dextrin and wood vinegar, or a polyalcohol such as ethylene glycol, glycerol, propylene glycol, sorbitol and saccharides.

In the cross-linking process, the hides are preferably cross-linked uniformly overall from the surface to the other surface in order to prepare a uniform dispersion of collagen fibers with the diameter of 1 to 4 $\mu$m and the length of 0.1 to 20 mm in dry state. When a cross-linking agent insufficiently penetrates inside the hides, a difference is caused in the degree of cross-linking in the hides. In the invention the hides are uniformly cross-linked with swelling.

In the case of using an aldehyde for example, the cross-linking is carried out under an acidic condition. The aldehyde penetrates sufficiently inside the hides resulting in uniform cross-linking, since the acid-swelling of the hides and the reaction of the aldehyde with the hides proceed slowly under the acidic condition. The solution of the aldehyde for cross-linking is adjusted to the pH in the acidic range by adding an acid with high electrolytic dissociation e.g. hydrochloric acid, sulfuric acid and nitric acid.

The solution of aldehyde has preferably low concentration, in particular, a solution of aldehyde with the concentration of 0.01 to 0.1% by weight of aldehyde and the pH of 2.5 to 5.0 is preferable. The hides are immersed into the solution of aldehyde at the temperature of 10° to 40° C. preferably 20° to 30° C. for 5 to 50 hours (according to the predetermined peak maximum temperature of the hides after cross-linking) while stirring gently. In the case of using glutaraldehyde, the solution is preferably adjusted to the pH of 3 to 4 and the concentration of 0.01 to 0.03% by weight of glutaraldehyde.

The cross-linking is accomplished at the time when the peak maximum temperature of the hides falls in the predetermined range mentioned above. The cross-linked hides are washed with water to remove the unreacted cross-linking agent, followed by being beaten and fibrated.

The cross-linked hides of the invention are hardly fibrilated and shortened by mechanically beating, and thin and long collagen fibers with the diameter of about 1 to 4 μm and the length of 0.1 to 20 mm in dry state are obtained by beating so that the viscosity and the spinnability of the aqueous dispersion at 1% by weight of collagen fibers fall in the ranges of 100 to 2,000 cP and of 30 to 80 mm, respectively. From the thus obtained dispersion with the predetermined viscosity may be obtained a shaped article of the invention having the small thickness, the high tensile strength and the high tear strength. The "spinnability" of the invention indicates a length of the liquid which can be pulled up without breaking at a speed of 50 mm/sec by a glass rod with the diameter of 10 mm after immersing the rod for 20 seconds into the aqueous dispersion of collagen fibers at a depth of 20 mm from the surface of the dispersion.

In the fibrating process of the invention, the cross-linked hides may be coarsely divided by a pulp-refiner and then finely divided by a vortical agitater type pulper, however, beating means is not restricted.

The pulp-refiner is a beater with a sufficient power for breaking the tissue structure (entanglement of bundles) of the cross-linked hides. The hides are repeatedly beaten by the pulp-refiner so that the viscosity of a 1% by weight aqueous dispersion of collagen fibers falls in the range of about 100 to 900 cP, and then finely divided by the vortical agitater type pulper with the jet speed of 15 to 25 m/sec to obtain an aqueous dispersion having the predetermined viscosity and spinnability.

When alkaline ions such as calcium ion and sodium ion due to calcium compound or sodium compound used in depilating and defatting process are present in the aqueous dispersion or when calcium and/or sodium are sedimented or linked between the dispersed fibers, in the electrodeposition process calcium and/or sodium are deposited on the electrode to reduce the current efficiency and dehydration of collagen fibers on the electrode hardly occur, resulting in the following disadvantages: a dense membrane is hardly obtained, the electrodeposition cannot be operated continuously for a long time, further, the heat of the electrode causes gelatination of the deposited collagen fibers.

The ash content (e.g. calcium or sodium as described above) is preferably below 0.3% by weight in the hides before cross-linking for continuous electrodeposition. For these purposes, the depilated and defatted hides are immersed at 10° to 20° C. for 5 to 30 hours into a solution with the pH of 3 to 5 of an organic acid e.g. acetic acid, succinic acid, propionic acid, butyric acid, tartaric acid or lactic acid.

The aqueous dispersion of collagen fibers for electrodeposition obtained from the hides treated as mentioned above (ash-removed hides) has the electric conductivity of 50 to 300 $\mu\mho$/cm at the pH of 3 to 4, and a membrane formed is well dehydrated on the cathode to obtain a dense and strong membrane with the water content of 4 to 12 g of water per one gram of collagen (g $H_2O$/g collagen) without overheat of the electrode due to excess current and the membrane can be pulled up continuously at a high speed of 5 to 30 m/sec.

In the invention, the thermal denaturation temperature was measured by using the differential scanning calorimeter Model DSC-1B manufactured by Perkin-Elmer Co., of which the temperature scale was calibrated by measuring the peak maximum temperature of endothermic denaturation of the standard substances i.e. benzophenone (melting point at 48.2° C.) and o-terphenyl (m.p. at 58.3° C.) at the scan speed of 4° C./min. In the calibration, 10 ml of a 0.5 M aqueous solution of sodium chloride and 10 ml of the same solution containing about 5 mg of the standard substance were provided in a reference aluminum pan and a sample aluminum pan, respectively. By the calibrated calorimeter, the thermal denaturation temperature of samples i.e. hides or shaped articles was measured at the scan speed of 4° C./min with 10 ml of a 0.5 M aqueous solution of sodium chloride in the reference pan and 10 ml of the same solution containing about 2 to 3 mg of the sample in the sample pan.

The following examples illustrate the invention in more detail, however, the scope of the invention should not be restricted to the examples. The invention may include various variations of the above-mentioned description and the examples within the scope of the invention.

EXAMPLE 1

Three sheets of salted steer hides of North America (100 kg) were cut at the dorsomedian into six sheets and immersed into water for 15 hours. After washing with water, fleshes and fats were removed from the hides by a fleshing machine. The fleshed hides were immersed into a depilating solution containing 2% by weight of slaked lime, 0.5% by weight of sodium sulfide and 0.5% by weight of diethylamine and stirred gently for 48 hours at 25°±2° C. This immersion caused hydrolysis of substances between collagen fibers and proteins other than collagen and a part of fats in the hides while depilating and swelling. The hides treated as above were further depilated by a depilating roll to be unhaired hides while removing the decomposition products formed in the treatment by the depilating solution.

The unhaired hides were splitted by a splitting machine into upper layers (papillary layer or grain layer) which are raw materials for leather and lower layers (reticular layer or corium layer) which were cut into the size of about 50 cm in width and about 100 cm in length after removing the thin periphery.

Forty kilograms of the cut corium layers were put into a wooden rotary drum of 120 cm in inner diameter and 100 cm in width, and 400 kg of water and acetic acid were added to adjust the pH to 4. After rotating and stirring at 6 r.p.m. for 3 hours, acetic acid was added to adjust again the pH to 4 followed by rotating the drum for 12 hours.

The corium layers were taken out of the drum and dehydrated by a wringing roll. After neutralizing and removing the acetic acid in the drum, the corium layers were again put into the drum and washed with a flow of a small amount of water while rotating the drum until the electric conductivity of waste water became below 20 $\mu \mho$/cm. The water-washed corium layers were dehydrated by the wringing roll to obtain ash-removed corium layers. The ash content in the ash-removed corium layers was measured after drying at 110° C. and heating at 700°±50° C. for 5 hours and was 0.21% by weight.

The ash-removed corium layers were sliced into 5 mm in width by a meat-slicer and finely cut into 5 to 20 mm in length by a mincing machine (hereinafter referred to as the finely cut and ash-removed hides). Forty kilograms of the finely cut and ash-removed hides was immersed into 400 kg of a cross-linking solution containing 0.015% by weight of glutaraldehyde and adjusted to the pH of 3.0 by hydrochloric acid, and stirred gently (at 6 r.p.m.) at 20° C. for 24 hours to be cross-linked and simultaneously swollen.

The peak maximum temperature of endothermic denaturation of the hides treated with glutaraldehyde was 67.1° C. and higher than that before cross-linking by 4.6° C.

Furthermore, the peak maximum temperature of the internal parts of the cross-linked hides is shown in FIG. 2 which indicates the uniform cross-linking inside the hides. In FIG. 2, the "blank" shows the peak maximum temperature inside the hides before cross-linking.

Then, the hides cross-linked and acid-swollen hides were removed from the cross-linking solution and washed out with water to remove unreacted glutaraldehyde. Forty kilograms of the cross-linked and washed hides were put into 360 kg of cool water with the temperature of 15°±2° C., and beaten and fibrated by circulating in a disk-type pulp-refiner used in ordinary paper manufacture to be a dispersion of which the viscosity is 500 cP at 1% by weight of collagen. The dispersion was not uniform because of undivided bundles contained, therefore, the dispersion was diluted with water to 1% by weight and adjusted to the pH of 3.6 to 3.8 by hydrochloric acid and then fibrated with a jet-type pulper, resulting in division of the undivided collagen bundles to be fibers with the diameter of 1 to 4 $\mu$m. After fibrating for 30 minutes by the jet-type pulper, a uniform and sticky dispersion containing 1% by weight of collagen fibers and having the viscosity of 990 cP and the spinnability of 80 mm was obtained.

The dispersion was diluted to 0.5% by weight and adjusted to the pH of 3.65 by hydrochloric acid to be the dispersion for electrodeposition with the electric conductivity of 208 $\mu \mho$/cm.

The dispersion was subjected to electrodeposition to form a membrane.

An apparatus for electrodeposition includes an anode of platinum net supported by a cylinder with holes of polyvinyl chloride having the inner diameter of 10 cm and the height of 70 cm, a stainless tubular cathode with the outer diameter of 1.75 cm and the height of 100 cm inside the anode, and a diaphragm holder with holes of polyvinyl chloride between the electrodes having the inner diameter of 5.6 cm and the thickness of 0.1 cm and being provided with a filter cloth of polypropylene. An aqueous solution of hydrochloric acid with the pH of 2.4 flows from the bottom of the anode cell, overflows from the top of the cell, falls into an anode solution holder and circulates by a pump. The dispersion flows from the bottom of the cathode cell, ascends within the cell and overflows from the top into a tank of the dispersion. The anode solution does not flow into the cathode cell since the top of the anode cell is lower than the top of the cathode cell. The anode solution and the dispersion introduced to the electrodeposition cell are maintained at the temperature below 10° C. by platecoolers provided between the holder or tank and the electrodeposition cell.

On applying a d.c. voltage of 600 V with the current of 15A between the electrodes, the collagen fibers in the dispersion transferred to the cathode due to their positive charge, reacted on the cathode with hydroxyl ions produced by electrolysis of water, neutralized, approached to the isoelectric point, released hydrated waters, agglomerated and formed a membrane on the cathode. The disperion for electrodeposition was maintained constantly at the inlet temperature of 10° C. and the outlet temperature of 14° C. The wet membrane immediately after electrodeposition had an enough strength to be pulled up at the speed of 15 m/min, and the operation of electrodeposition could be continued for a long time. The wet membrane was dried by a drier recycling hot air at 75° C. at the speed of 10 m/sec while blowing the membrane with air of the pressure of 150 mm of water.

The curve of thermal denaturation temperature of the shaped article of the invention is shown in FIG. 1. The peak maximum temperature of endothermic denaturation was 64.6° C. and 85.3% of the total endothermic enthalpy was absorbed within the temperature range of 64.6°±4.6° C.

The article of the invention had the thickness of 9 $\mu$m in dry state, the wet tensile strength of 5.1 kg/mm$^2$ in longitudinal and 4.8 kg/mm$^2$ in transverse, the wet tear strength of 45 g·cm/cm in longitudinal and 34 g·cm/cm in transverse and the elongation in wet stage of 38% in longitudinal and 40% in transverse, the wet tensile- and tear strength being measured according to JIS P-8116 and 8113.

Furthermore, the electron micrograph of the shaped article of the invention is shown in FIG. 3. As seen from FIG. 3, the article of the invention is consisted essentially of collagen fibers with the diameter of 1 to 4 $\mu$m and the length of 0.1 to 10 mm in dry state. For reference, the electron micrographs of the article of native sheep intestines and of the shaped article obtained by electrodeposition of collagen fibrils fibrated without cross-linking are shown in FIGS. 4 and 5, respectively.

EXAMPLES 2 to 7

Each forty kilograms of the finely cut and ash-removed hides treated as Example 1 were cross-linked and swollen in 400 kg of a cross-linking solution adjusted to the pH of 3.0 by hydrochloric acid and containing glutaraldehyde, of which the concentration is shown in Table 1 respectively, while gently stirring (30 r.p.m.) at 20° C. for 24 hours.

The peak maximum temperatures of endothermic denaturation of the hides and the properties of the dispersion obtained by the same manner as Example 1 are shown in Table 1.

The dispersion was subjected to electrodeposition as Example 1. The properties of the membrane just after electrodeposition and the shaped articles obtained by drying are also shown in Table 1. Further, the uniformity of cross-linking of the hides in Example 2 (glutaraldehyde of 0.01% by weight) is shown in FIG. 2.

COMPARATIVE EXAMPLE 1

Forty kilograms of the finely cut and ash-removed hides prepared as Example 1 was immersed into 400 kg of an aqueous solution adjusted to the pH of 3.5 of hydrochloric acid, and acid-swollen while maintaining at 20°±1° C. and gently stirring for 24 hours. The swollen hides were beaten with the same disk-type pulp-refiner as Example 1. The hides were extremely fibrilated and shortened with division of the bundles, and the obtained dispersion had the viscosity more than $2 \times 10^4$ cP with 1% by weight of collagen and thereby electrodeposition was impossible to proceed in the same apparatus as Example 1. Then, after dilution to 0.2% by weight of collagen, the membrane was obtained by pulling up at a slower speed of 2 m/min in the electrodeposition apparatus. The membrane just after electrodeposition had the water content of 15 to 20 g $H_2O$/g collagen and the poor strength, and it was impossible to pull up at the higher speed more than 2 m/min.

The properties of the membrane were; the wet tensile strength of 2.2 kg/mm$^2$ in longitudinal and 1.9 kg/mm$^2$ in transverse, the wet tear strength of 10 g·cm/cm in longitudinal and 8 g·cm/cm in transverse, the elongation of 30% in longitudinal and 34% in transverse and the dry thickness of 18 μm. Further, the curve of the thermal denaturation temperature of the membrane is shown in FIG. 1.

COMPARATIVE EXAMPLE 2

Forty kilograms of the finely cut and ash-removed hides treated as Example 1 were immersed into 400 kg of a 0.001% by weight solution of glutaraldehyde with the pH of 3.4 adjusted by hydrochloric acid and stirred gently at 20°±1° C. with 6 r.p.m. until the peak temperature became 63.0° C. Then, the cross-linked hides was beaten by the same disk-type pulp-refiner as Example 1, however, the viscosity increased to 14000 cP with the 1% by weight of collagen even when unfibrated collagen bundles remained. With further circulation into the pulp-refiner, the viscosity was 30000 cP. After diluting to 0.2% by weight and adjusting the pH to 3.65 by hydrochloric acid, a wet membrane with the water content of more than 15 g $H_2O$/g collagen and the poor strength was obtained.

The properties of the membrane obtained were; the wet tensile strength (longitudinal) of 2 kg/mm$^2$, the wet tear strength (longitudinal) of 12 g·cm/cm and the dry thickness of 18 μm.

EXAMPLES 8 to 11

Each forty kilograms of the finely cut and ash-removed hides treated as Example 1 were immersed into 400 kg of a cross-linking solution shown in Table 1 adjusted to the pH of 3.0, and cross-linked and swollen while gently stirring (30 r.p.m.) at 20° C. for 24 hours. The peak temperatures of endothermic denaturation of thus treated hides are shown in Table 1.

Then, the cross-linked hides were fibrated to prepare a dispersion of which the properties are also shown in Table 1, and the properties of the articles obtained by electrodeposition as Example 1 are further shown in Table 1.

TABLE 1

| | | | cross-linking | | | | | | |
|---|---|---|---|---|---|---|---|---|---|
| | | | Denaturation temperature of raw hide Peak maximum °C. | Denaturation temperature of cross-linked hide Peak maximum °C. | Increase of temperature by cross-linking Difference of peak maxima °C. | Weight ratio of cross-linking solution to hide | Properties of dispersion | | Properties of membrane on electrodeposition |
| Example No. | Agent | Concentration % by weight | | | | | Viscosity cP | Spinnability mm | Water content g$H_2O$/g collagen / Tensile strength kg |
| 1 | Glutaraldehyde | 0.015 | 62.5 | 67.1 | 4.6 | 10 | 990 | 80 | 5.8 / 1.6 |
| 2 | | 0.010 | 62.5 | 64.8 | 2.3 | 10 | 1750 | 75 | 8 / 1.2 |
| 3 | | 0.020 | 62.5 | 69.0 | 6.5 | 10 | 385 | 65 | 5.0 / 1.7 |
| 4 | | 0.020 | 62.5 | 69.0 | 6.5 | 10 | 385 | 65 | 5.0 / 1.7 |
| 5 | | 0.025 | 62.5 | 70.3 | 7.8 | 10 | 295 | 60 | 4.5 / 1.5 |
| 6 | | 0.030 | 62.5 | 71.7 | 9.2 | 10 | 200 | 50 | 4.2 / 1.6 |
| 7 | | 0.030 | 62.5 | 71.7 | 9.2 | 10 | 200 | 50 | 4.2 / 1.6 |
| 8 | Dialdehyde starch | 0.010 | 62.1 | 63.9 | 1.8 | 10 | 1950 | 30 | 12 / 0.6 |
| 9 | | 0.050 | 62.1 | 65.7 | 3.6 | 10 | 1550 | 35 | 10 / 0.8 |
| 10 | Glyoxal | 0.050 | 62.0 | 63.0 | 1.0 | 10 | 1900 | 30 | 11 / 0.7 |
| 11 | Formalin | 0.050 | 62.1 | 63.9 | 1.8 | 10 | 1900 | 30 | 11 / 0.7 |

| | | Properties of membrane | | | | |
|---|---|---|---|---|---|---|
| Example No. | Thickness μ | Denaturation temperature Peak maximum °C. | Endothermic enthalpy[1] | Wet tensile strength[2] L/T[4] kg/mm$^2$ | Wet tear strength[2] L/T[4] g·cm/cm | Elongation[3] L/T[4] % |
| 1 | 10 | 64.6 | 85.3 | 5.1/4.8 | 45/34 | 38/40 |
| 2 | 10 | 62.1 | 80.5 | 3.6/3.2 | 25/32 | 39/47 |
| 3 | 10 | 66.4 | 86.5 | 6.0/5.2 | 48/36 | 34/36 |

TABLE 1-continued

|   |   |      |      |         |         |       |
|---|---|------|------|---------|---------|-------|
| 4 | 5 | 66.4 | 86.5 | 6.2/5.1 | 26/25   | 32/35 |
| 5 | 10 | 68.5 | 82.5 | 6.4/5.6 | 52/50   | 42/38 |
| 6 | 10 | 70.3 | 78.0 | 5.7/4.9 | 60/44   | 55/50 |
| 7 | 20 | 70.3 | 78.0 | 6.0/5.0 | 165/120 | 45/32 |
| 8 | 20 | 62.1 | 70.4 | 3.2/3.1 | 26/27   | 37/42 |
| 9 | 15 | 63.9 | 76.2 | 3.5/3.7 | 25/27   | 21/45 |
| 10 | 15 | 62.1 | 76.5 | 3.1/3.0 | 28/30   | 32/31 |
| 11 | 15 | 62.1 | 77.8 | 3.7/3.9 | 29/30   | 31/35 |

Notes:
[1] Percentages of endothermic enthalpy absorbed within the temperature range of ± 4.6° C. around the peak maximum temperature as center to the total endothermic enthalpy,
[2] Measured after immersing into water for 30 seconds,
[3] Elongation without breaking in wet state,
[4] L and T denote longitudinal and transverse, respectively.

What is claimed is:

1. A process for preparing a shaped article of collagen comprising cross-linking a collagenous material so that the difference of the peak maximum temperatures of endothermic denaturation of the material between before and after the cross-linking falls in the range of 1.0° to 10° C. and the peak maximum temperature after the cross-linking falls in the range of 63° to 74° C., fibrating the cross-linked collagenous material to prepare an aqueous dispersion with the viscosity of 100 to 2000 cP and the spinnability of 30 to 80 mm at the concentration of 1% by weight of collagen fiber and subjecting the dispersion to electrodeposition.

2. The process of claim 1, wherein the collagenous material is cross-linked by an aldehyde while subjecting to acid-swelling.

3. The process of claim 2, wherein the cross-linking is effected with a cross-linking solution of the aldehyde having the pH of 2.5 to 5.0 and the concentration of 0.01 to 0.1% by weight of the aldehyde.

4. The process of claim 2 or 3, wherein the aldehyde is selected from the group consisting of formaldehyde, acetaldehyde, glyoxal, methylglyoxal, glycol aldehyde, acrolein, crotonaldehyde, succinyl aldehyde, glutaraldehyde, dialdehyde starch, dialdehyde dextrin and wood vinegar.

5. The process of claim 3, wherein the cross-linking is effected with a cross-linking solution having the pH of 3 to 4 and containing 0.01 to 0.03% by weight of glutaraldehyde.

6. The process of claim 1, wherein the ash-content in the collagenous material is reduced below 0.3% by weight with an organic acid of the pH of 3 to 5 before the cross-linking.

7. The process of claim 6, wherein the dispersion of collagen fibers for electrodeposition has the pH of 3 to 4 and the electric conductivity of 50 to 300 $\mu\Omega$/cm.

* * * * *